(No Model.)
S. PALMITER.
METHOD OF MANUFACTURING BICYCLES.
No. 547,400.  Patented Oct. 1, 1895.
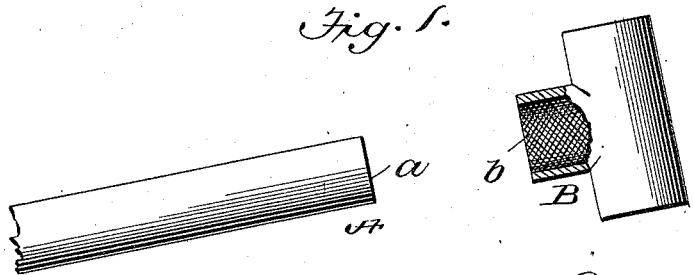
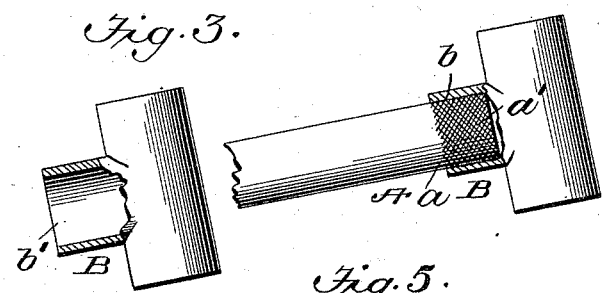
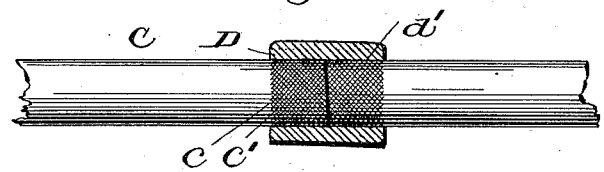
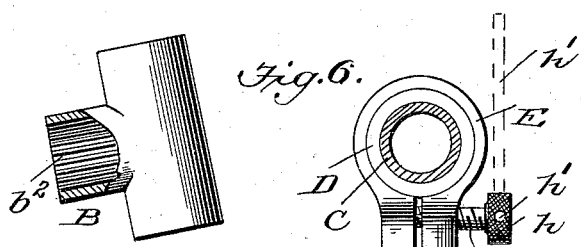
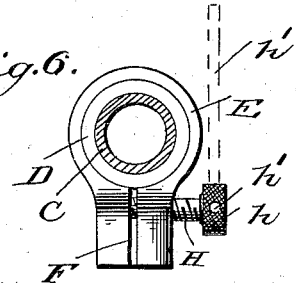
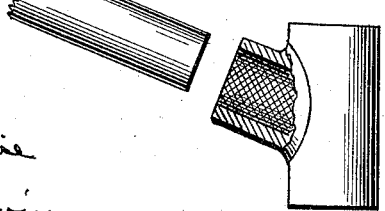
Witnesses
Inventor
Samuel Palmiter
by Milo Harris
Attorney
ANDREW B.GRAHAM. PHOTO-LITHO. WASHINGTON, D.C.

UNITED STATES PATENT OFFICE.

SAMUEL PALMITER, OF JAMESTOWN, NEW YORK.

METHOD OF MANUFACTURING BICYCLES.

SPECIFICATION forming part of Letters Patent No. 547,400, dated October 1, 1895.

Application filed January 17, 1895. Serial No. 535,578. (No model.)

*To all whom it may concern:*

Be it known that I, SAMUEL PALMITER, a citizen of the United States, residing in the city of Jamestown, in the county of Chautauqua and State of New York, have invented certain new and useful Improvements in the Method of Manufacturing Bicycles; and I do hereby declare that the following is a full, clear, and exact description of the invention, which will enable others skilled in the art to which it appertains to make and use the same.

The object of my invention is to provide a cheap and efficient method of putting bicycles, velocipedes, and other articles together which are made in part or wholly of tubing, and one that overcomes the objection found in the common method of brazing.

The improvement consists in serrating or otherwise so preparing the parts to be united that when properly expanded together a strong joint is made, all of which will be fully understood by these specifications and the accompanying drawings, in which—

Figure 1 is a view showing a tube or part of a bicycle, the end being smooth ready to be inserted in a coupling provided on its inner surface with serrations. Fig. 2 is a view of the parts united by my improved method, showing the serrations as having been forced into the tube. Fig. 3 is a view showing the coupling as being smooth on its inner surface. Fig. 4 is a similar view showing the inner surface of the coupling with longitudinal parallel serrations. Fig. 5 is a view showing how the handle-bar is expanded in the head or steering part of a bicycle. Fig. 6 is a view showing how I prevent too much expansion by inserting the parts into a collar or clamp while being expanded. Fig. 7 is a view showing the joint on an angle.

The common method of making bicycles or other articles composed wholly or in part of tubing by brazing the sections or joints together is found very expensive and unsatisfactory for the following reasons: The parts to be brazed have to be filed or otherwise made bright in order to have the solder adhere. The fittings have to be made loose enough so the solder will flow through the joints, and the parts have to be pinned together to keep them in position when in the fire. The fire injures and greatly deteriorates the tubing, and where the work has to be afterward made smooth for polishing or plating the expense of filing and removing all fire-marks is not only costly, but the outer surface of the tubing is destroyed, leaving it weak where it ought to be strong. All of these objections are overcome where my improved method is used.

In the drawings, A is a piece of tubing cut a suitable length for one part of a bicycle-frame.

B is the connection, which may be straight or at any desired angle, as in Fig. 7, having serrations on the inner side, as shown. The serrations are preferably made with a knurling-tool, but other tools to do the same work might be employed. The connection-joint should be bored as near exact size of the circumference of the tubing as may be to make a close joint, and when serrated, as at $b\ b^2$, the end of the tube should be shoved into this connection and the tube is expanded cold by the roller process. Thus a strong joint is quickly made without heating or in any way injuring or destroying the tubing.

Fig. 5 shows a bicycle-head or steering-post bored to the size of the section of handle C, shown in said figure, and after being serrated the handle-bar is expanded into the serrations, which will cut into said handle-bar, as indicated on the surface of said bar, and so closely uniting the bar and head that they cannot be separated without destroying them. It will sometimes be found advisable to employ a ring or clamp to go over the parts to be expanded to guide the party making the expansion, that he may know when the desired amount of expansion has been attained, and for this purpose I employ an adjustable head or clamp, as shown in Fig. 6. This should be drawn closely around the parts before the expansion takes place. The edge of the clamp may be made to fit any desired angle. Where little strain comes on the joints a slight roughening of the parts will be sufficient, and it will hold quite well if left smooth, but such joints will not stand constant jar and strain as when well serrated. Tubing can be reinforced by this method.

The handle-bar may be made in two parts and joined at the center, as shown in Fig. 6, but I prefer it in one piece.

I claim—

1. The method of making the joints of bicycles and other articles made wholly or partly of tubing, which consists in serrating one of the parts and uniting the parts by expanding the inner part into the serrations by the cold roller process.

2. The method of reinforcing the parts or joints of bicycles or other articles made wholly or partly of tubing, which consists in serrating one of the parts and uniting the parts by expanding the inner tube into the serrations.

In testimony that I claim the foregoing I hereby sign my name in the presence of two witnesses.

SAMUEL PALMITER.

Witnesses:
S. A. BALDWIN,
MILO HARRIS.